United States Patent Office 3,240,724
Patented Mar. 15, 1966

3,240,724
DRY SULFONATED ION EXCHANGE RESIN
COMPOSITIONS
Herbert R. Moody, Huntingdon Valley, Pa., assignor to Rohm & Haas Company, Philadelphia, Pa., a corporation of Delaware
No Drawing. Filed Sept. 16, 1960, Ser. No. 56,359
4 Claims. (Cl. 260—2.2)

This invention concerns cation exchange resin compositions and more particularly concerns dry free-flowing cation exchange resin compositions specifically designed for water softening.

Since most ion exchange resins contain approximately 50 percent water when in equilibrium with water, i.e., in the so-called "wet" form, there has always been the desire to ship the dry form in order to save freight and facilitate handling. This is particularly true in the case of domestic softening, i.e. water softening units for use in the home. In this industry, there is the necessity for filling numerous small units and a free-flowing exchanger composition is very desirable.

It has been found that stable free-flowing anhydrous cation exchange compositions can be prepared by mixing a dry macroreticular structured sulfonic cation exchange resin in the acid form with at least one equivalent of an anhydrous alkaline sodium salt. It is surprising that the acid form of the resin, although a very strong acid, does not react with the alkaline sodium salt until the composition is wetted with water. When this composition is charged to a softening unit partially filled with water, immediate conversion of the resin to the desired sodium form is obtained. If sodium carbonate or bicarbonate is used as the alkaline sodium salt, then carbonic acid is formed when the carbonate or bicarbonate reacts with the acid form of the resin. This will either remain in solution in the water or be evolved as $CO_2$. If borax is used, then boric acid is formed on reaction with the cation resin. This is essentially non-corrosive, and can be readily washed from the resin bed. The reaction of the acid form of the resin with caustic produces the sodium form of the resin and water.

It is important that the cation exchange resin be a cross-linked copolymer and that it possesses a macroreticular structure. The preparation and properties of typical cross-linked resins possessing macroreticular structures is set forth in detail in French Patent No. 1,237,343 which was published on June 20, 1960 (corresponding to U.S. Serial No. 749,526 which was filed July 18, 1958, and is in the hands of the same assignee as is the present application), and the information therein is incorporated herein by reference. A preferred class of resins are those prepared by the sulfonation of a copolymer of a monovinyl aromatic hydrocarbon and a polyvinyl aromatic hydrocarbon prepared under the conditions set forth in French Patent No. 1,237,343. Specifically, from the standpoint of economy and general utility, sulfonated styrene-divinylbenzene copolymers are particularly preferred.

It is necessary to use cation exchangers prepared according to French Patent No. 1,237,343 in this invention because the so-called "conventional" resins, if they do not break down physically on drying, will be reduced to fragments on immersing in water. However, the cation exchangers possessing macroreticular structures, even though highly cross-linked, can be repeatedly wetted and dried without any physical breakdown.

Since the resin and the alkaline sodium salt will react in the presence of moisture, it is imperative that the container used for storing and/or shipping the compositions of the present invention be impervious to moisture or water vapor. However, containers possessing this characteristic are common articles of commerce. Typical are double walled paper bags with a layer of asphalt or other water impervious mastic between the two layers, paper bags coated on the inside with a layer of polyethylene or other water impervious plastic, bags, boxes and drums, with a removable inner liner of polyethylene, etc.

There is a lower limit to the amount of alkaline material that can be satisfactorily used in the compositions of the present invention. There must be present at least one equivalent of the alkaline sodium salt per equivalent of sulfonic acid grouping in the resin. There is no upper limit on the amount of alkaline material which can be used but there is no benefit derived by using large excesses. It is preferred to use a slight excess of the alkaline sodium salt to make absolutely certain that the conversion of the resin to the sodium form is complete, even if the water being used should be slightly acid. An excess of the sodium salt of 5 to 10% represents the preferred embodiment.

Although coarse particle size alkaline sodium salts are operable, it is desired to use fine particle size because it is easier to get a uniform mixture of the alkaline sodium salt with the resin and because the fine particle size sodium salts dissolve more rapidly in water and thus effect more rapid neutralization of the acid form of the resin. Fine particle size alkaline sodium salts are readily available as standard articles of commerce or can be prepared by grinding, micropulverizing, etc.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

To 100 grams of a sulfonated dry styrene-divinylbenzene copolymer containing 20% divinylbenzene and prepared by the method set forth in Serial No. 749,526 was added 21.3 grams of finely ground sodium hydroxide. The mixture was blended intimately and stored in a moisture-proof container. When this blend was added to water, the sodium form of the resin was immediately formed. The composition could be stored indefinitely in the moisture-proof container without interaction.

*Example II*

28.3 grams of fine particle size sodium carbonate was used to replace the sodium hydroxide of Example I. When the mixture of resin and sodium carbonate was added to water, the sodium form of the resin was immediately formed. There was some bubbling of the water above the resin due to the evolution of carbon dioxide.

*Example III*

The sodium carbonate of Example II was replaced by an equivalent amount (45.0 grams) of sodium bicarbonate. Comparable results were obtained.

*Example IV*

54.5 grams of finely ground dehydrated borax was used to replace the sodium hydroxide of Example I. Again, on adding to water, the sodium salt of the resin formed immediately and the water contained boric acid. This boric acid was readily removed from the resin by draining the water from the resin and subsequently rinsing the resin with water until there was no boric acid in the rinse water.

I claim:
1. A dry ion exchange composition which comprises a dry macroreticular structured sulfonic cation exchange resin in the hydrogen form in intimate admixture with at least one equivalent of a compound from the class consisting of water-soluble sodium hydroxide, sodium carbonate, sodium bicarbonate and dehydrated borax per equivalent of sulfonic acid grouping in the cation exchange resin.

2. An ion exchange composition as set forth in claim 1 in which the cation exchange resin is a sulfonated styrene-divinylbenzene copolymer.

3. A composition as set forth in claim 1 in which the compound which is in intimate admixture with the resin is sodium carbonate.

4. A dry ion exchange composition which comprises a dry macroreticular structured sulfonic cation exchange resin in the hydrogen form in intimate admixture with from about 1.05 to about 1.1 equivalents of a compound from the class consisting of water-soluble sodium hydroxide, sodium carbonate, sodium bicarbonate and dehydrated borax per equivalent of sulfonic acid grouping in the cation exchange resin.

References Cited by the Examiner
UNITED STATES PATENTS

| | | | |
|---|---|---|---|
| 2,754,829 | 7/1956 | Hess | 260—2.2 |
| 3,037,052 | 5/1962 | Bortnick | 260—2.2 |

OTHER REFERENCES

Kunin, Ion Exchange Resins, John Wiley and Sons, New York (1958), 2d Edition, pages 124–125.

WILLIAM H. SHORT, *Primary Examiner.*

HAROLD N. BURSTEIN, *Examiner.*